May 30, 1961
B. C. BUNCE
2,986,163
FLUID PROPORTIONING DEVICE
Filed Jan. 11, 1957
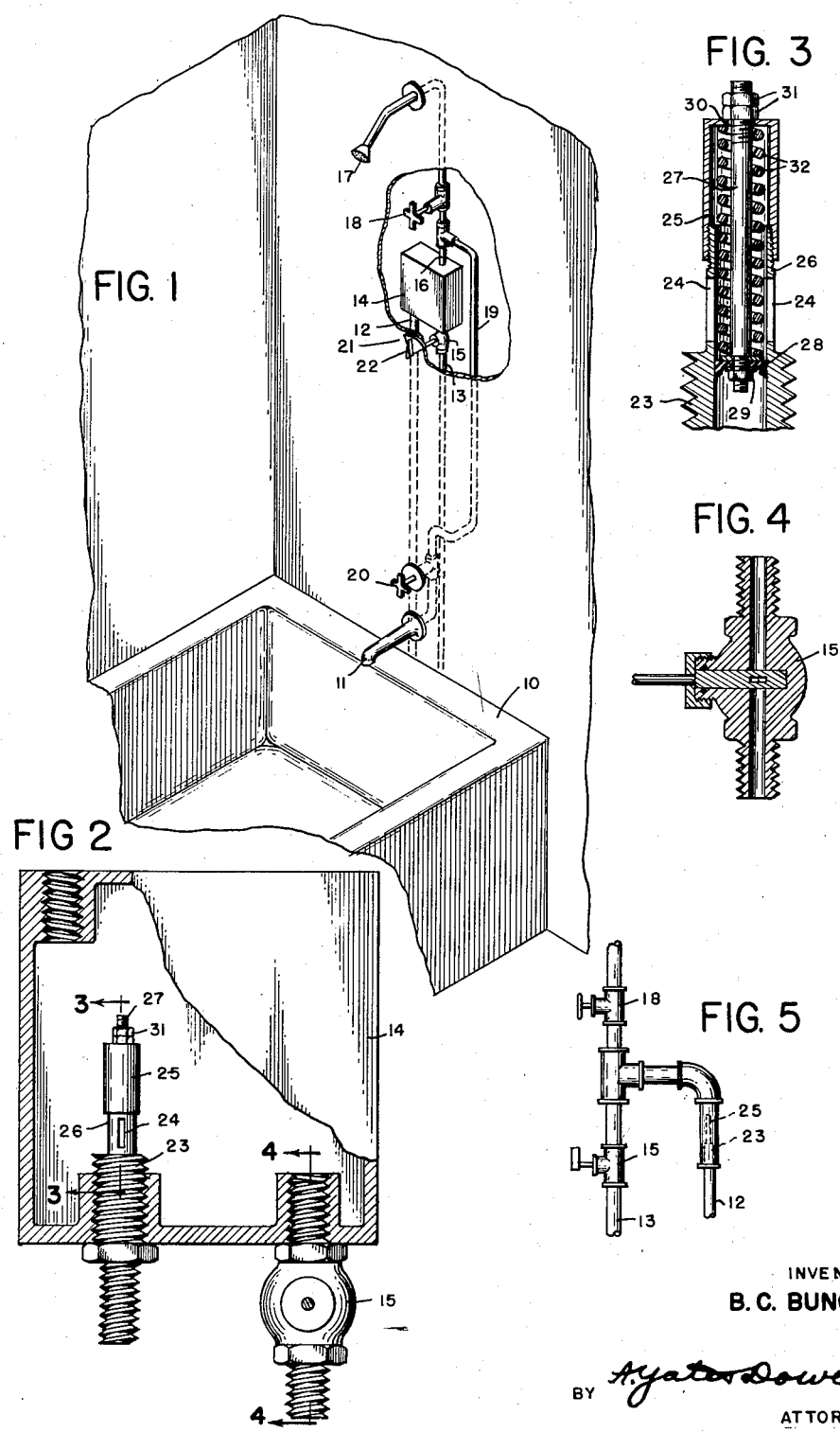
INVENTOR
B. C. BUNCE
BY *A. Yates Dowell*
ATTORNEYS

United States Patent Office 2,986,163
Patented May 30, 1961

2,986,163

FLUID PROPORTIONING DEVICE

Broadus C. Bunce, P.O. Box 13, Stedman, N.C., assignor of one-fourth to John C. Gager, Westmoreland Hills, Md.

Filed Jan. 11, 1957, Ser. No. 633,741

1 Claim. (Cl. 137—606)

This invention relates to the proportioning of fluids by means of valves under the control of a person in which the control may be obtained with a single valve for obtaining a desired ratio of the fluids to be mixed in the resulting fluid. More particularly, the invention relates to a control for the regulation of water to obtain a desired temperature from waters of two different temperatures such as water for washing, showers, and the like.

The invention relates specifically to a temperature regulator of a hollow construction adapted to receive hot and cold water and by the manipulation of a single handle or control to regulate or vary the temperature in a manner to supply liquid at any desired temperature between the extremes of that supplied.

In proportioning two or more fluids, such as liquids or gases or fluidized solids, the regulation has frequently been accomplished by means of manually or automatically controlled valves but the number of valves and the cost of automatic control has been so great as to render such automatic control out of reach of a large market. An object of the present invention is to provide a proportioning device for fluids including gases and liquids and fluidized solids, for proportioning the amount of two or more fluids in a resulting mixture.

Another object is to provide a proportioning device which is under the control of a person with a minimum of adjustment to provide complete control of the proportion with a single manually controlled valve.

A further object is to provide a system for mixing fluids under accurate control over an extended range by manual and automatic valve systems and which can be operated to feed any one of the fluids while stopping the other or any proportion of the several fluids.

A further object is to provide a fluid proportioning device adapted for use with a plurality of fluids to be mixed in a pre-determined proportion under the control of a person and under the control of automatic valves.

In prior distributing systems dual controls have been used, one for hot and one for cold water, and regulation of temperature has been attempted by the independent manipulation of such controls so that in use, as for example in taking a shower, extreme temperatures have been experienced resulting in discomfort and sometimes injury and this also has resulted in waste, the spattering of water, and has required skill to obtain water of the proper temperature. Further, the volume of the supply such as low water in a hot water heater, has presented an additional problem making it difficult to compensate for loss of heat due to reduction in volume of the water in the water heater and automatically maintain the temperature adjustment and an even constant temperature and flow of the liquid.

It is an object of the invention to overcome the difficulties enumerated and to provide a relatively simple and inexpensive water temperature regulator including a mixing chamber into which liquid of different temperatures such as hot and cold water is admitted and having a single operating element by which the desired temperature can be obtained as well as a temperature which can be easily operated to obtain the desired water temperature.

Other objects and advantages of the invention will be apparent from the following description taken in conjunction with the accompanying drawing wherein:

Fig. 1 is a fragmentary perspective of a bathroom with the present invention applied thereto;

Fig. 2, a front elevation of the mixing chamber with the cover removed;

Fig. 3, a fragmentary detail section taken on the line 3—3 of Fig. 2;

Fig. 4, a fragmentary detail section taken on the line 4—4 of Fig. 2 and

Fig. 5, a plan view of a modified form of the invention.

Briefly stated, the present invention includes a mixing chamber into which a plurality of fluids are introduced through manual and/or automatic valves and wherein the outlet from said chamber is under the control of valve means whereby the quantity of fluids from the mixture of fluids is controlled; the admission of fluids from their respective supplies to the chamber also being controlled. It is contemplated that a plurality of fluids may be supplied to the chamber and as an example, two are shown although it is to be understood that a greater number of fluids may be supplied as desired and the control may be by automatic valves such as spring loaded valves and/or by the manual valves or combinations thereof.

With continued reference to the drawing, water is adapted to be supplied to a bathtub 10 through an inlet 11 from hot and cold water lines 12 and 13, the admission of water to the tub heretofore having being supplied directly from such lines and controlled by conventional faucets, not shown.

In the present instance instead of controlling the admission of water to the tub in the conventional manner, water through the hot and cold lines 12 and 13 is admitted to a hollow body which forms a relatively small flat mixing chamber 14 in which the hot and cold water is combined to give the desired temperature.

Hot water admitted to the mixing chamber through the pipe 12 is reduced in temperature by the introduction into the mixing chamber of cold water through the cold water line 13, a manually operated valve 15 being provided in the cold water line near the connection with the mixing chamber for controlling admission of the cold water into the mixing chamber for direct use or for reducing the temperature of the hot water therein.

Water of the desired temperature is discharged from the mixing chamber through a pipe 16 to a shower head 17, the flow and pressure of such water being controlled by a hand valve 18. Joined to the pipe 16 is a pipe 19 which supplies water to the inlet 11, the flow of such water being controlled by a hand valve 20.

In order to control mixing of water in the mixing chamber 14 the valve 15 is provided as stated, the setting being in accordance with the preference of the operator for controlling the flow and pressure of water admitted to the mixing chamber, such valve being constructed to provide constant increase of water between the closed and fully open position, and to facilitate its use a chamber or dial 21 and an indicator handle 22 may be provided.

The admission of hot water is automatically controlled by a valve (Figs. 2 and 3), such valve including an externally threaded tubular member 23 having slots 24 through which water can pass into the mixing chamber. An internally threaded cap 25 threadedly engages the externally threaded reduced end portion 26 of the tubular member 23. Within the threadedly connected ends of the members 23 and 25 is mounted a valve stem 27 having a cup valve 28 held on one end by means of a nut 29, the cup valve 28 being of an external diameter to fit snugly within the bore of the externally threaded tubular member 23, the opposite end of the valve stem 27 extends through an opening 30 in the cap 25 and is provided with a pair of locknuts 31 which are threaded and adjustably engage the valve stem 27. A helical spring 32 encircles the valve stem 27 and normally retains the valve 28 on the opposite side of the slots 24 forming the discharge openings from the cap 25.

In the operation of the automatic hot water valve, water flows into the threaded tubular coupling 23, the pressure of which is balanced by the water within the chamber; the spring 32 however, causes the valve 28 to be disposed so that no water can enter the mixing chamber until the pressure within the chamber drops and the pressure of the water in the coupling 23 overcomes the pressure within the chamber and the pressure of the spring 32, whereupon combining of the water is permitted and, by controlling the handle 22 a modification or reduction in temperature of hot water can be accomplished, and water leaving the chamber through the pipe 16 can be supplied to the shower head 17 by opening the valve 18, or to the tub by opening the valve 20. The tension in spring 32 is considerably less than the pressure in the water line and is employed to regulate the amount of hot water which can enter the chamber.

From the foregoing it will be apparent that a water or other liquid temperature regulator is provided which can be easily and inexpensively produced from readily available materials, which can be installed with minimum effort and expense and which will make it possible with minimum effort to control the temperature of water used in a bathroom and other places for various purposes.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A fluid mixture regulator comprising a hollow body having an inlet thereinto for a fluid of one type, and a second inlet thereinto for a liquid of a different type, a spring biased valve in one of said inlets having means responsive to the pressure differential between its inlet and the interior of the hollow body; a manually operable valve in said other inlet operable at will to provide more or less or substantially the same pressure drop provided in said one line by said spring biased valve, and valve means for controlling the volume of discharge of fluid from said hollow body.

References Cited in the file of this patent

UNITED STATES PATENTS

| | | |
|---|---|---|
| 116,485 | Porteous | June 27, 1871 |
| 883,874 | Gambee | Apr. 7, 1908 |
| 914,400 | Firth | Mar. 9, 1909 |
| 1,202,263 | Bills et al. | Oct. 24, 1916 |
| 1,327,850 | Ziemer | Jan. 13, 1920 |
| 1,542,230 | Ganz | June 16, 1925 |
| 2,494,044 | Jurisich et al. | Jan. 10, 1950 |
| 2,569,857 | Jaegle et al. | Oct. 2, 1951 |
| 2,758,610 | Hivley | Aug. 14, 1956 |